(12) United States Patent
Chakraborty et al.

(10) Patent No.: US 8,505,017 B1
(45) Date of Patent: Aug. 6, 2013

(54) METHOD AND SYSTEM TO PROTECT MULTIPLE APPLICATIONS IN AN APPLICATION SERVER

(75) Inventors: Krishnendu Chakraborty, San Mateo, CA (US); Arvind Prabhakar, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 2376 days.

(21) Appl. No.: 10/941,376

(22) Filed: Sep. 15, 2004

(51) Int. Cl.
*G06F 9/46* (2006.01)

(52) U.S. Cl.
USPC .......................................... 718/104

(58) Field of Classification Search
USPC .......................................... 718/104
See application file for complete search history.

(56) References Cited

U.S. PATENT DOCUMENTS

| | | | |
|---|---|---|---|
| 6,304,967 B1* | 10/2001 | Braddy | 713/150 |
| 2003/0167298 A1* | 9/2003 | Bazinet et al. | 709/203 |
| 2004/0163087 A1* | 8/2004 | Sandland et al. | 719/310 |
| 2006/0041885 A1* | 2/2006 | Broquere et al. | 718/1 |

* cited by examiner

*Primary Examiner* — Mengyao Zhe
(74) *Attorney, Agent, or Firm* — Osha Liang LLP

(57) ABSTRACT

A method for processing a first request including receiving the first request, determining a first application associated with the first request, determining a first filter instance parameter associated with the first application, instantiating a first filter instance using the first filter instance parameter, and processing the first request using the first filter instance.

15 Claims, 3 Drawing Sheets

METHOD AND SYSTEM TO PROTECT MULTIPLE APPLICATIONS IN AN APPLICATION SERVER

BACKGROUND

In a computing environment (i.e., computer network, cluster, etc.), numerous applications providing various software services and functions are developed and deployed. Typically, these applications are deployed in conjunction with an application server that is running on a virtual machine. An application server provides a hosting platform under which an application is operable. A typical application server employs standards, e.g., Java 2 Platform, Enterprise Edition (J2EE), to enable developers to create web-based applications.

Web-based applications developed using the aforementioned standards typically include an Extensible Markup Language (XML) file (i.e., a deployment descriptor) that contains document descriptions. A portion of the XML file is related to user authentication. A web-based application includes resources that may be accessed by users as a uniform resource locator (URL). In some cases, these resources may be protected. In order to gain access to protected resources, user authentication is required.

Conventionally, filters (e.g., servlet filters, application filters, etc.) are implemented to integrate the application server with an identity server. The filters are also used to authenticate users of web-based applications. For example, when a resource is accessed by a user, the filter intercepts the request and authenticates the user against a proprietary security implementation or a user registry that is capable of integrating with the identity server. If the user is already authenticated, the filter is capable of making the container (that includes the web-based application) aware of the authentication. Filters are typically transparent to the end user and are part of the web-based application.

Further, filters are typically one of the many functionalities provided by agents. Agents are installed on the application server to provide a variety of functionalities, such as caching, event notifications, etc. A particular function of the agent includes protection of the web-based applications and resources available via the web-based applications. Therefore, the agent configures and gathers the parameters required for each application running within the application server. In some instances, each application running on the application server is running on a separate virtual machine. In this case, different applications may require different levels of authentication or authorization. In order to provide the necessary policy validations and user authentication that is specific to each application, an agent is installed for each application that is running.

SUMMARY

In general, in one aspect, the invention relates to a method for processing a first request comprising receiving the first request, determining a first application associated with the first request, determining a first filter instance parameter associated with the first application, instantiating a first filter instance using the first filter instance parameter, and processing the first request using the first filter instance.

In general, in one aspect, the invention relates to a system comprising a client configured to send a first request to a first application, and an agent configured to intercept the first request, determine a first application associated with the first request, determine a first filter instance parameter associated with the first application, instantiate a first filter instance using the first filter instance parameter, and process the first request using the first filter instance.

In general, in one aspect, the invention relates to a computer system for processing a request, comprising a processor, a memory, a storage device, and software instructions stored in the memory for enabling the computer system under control of the processor, to receive the first request, determine a first application associated with the first request, determine a first filter instance parameter associated with the first application, instantiate a first filter instance using the first filter instance parameter, and process the first request using the first filter instance.

In general, in one aspect, the invention relates to a plurality of nodes, comprising a client configured to send a first request to a first application, and an agent configured to intercept the first request, determine a first application associated with the first request, determine a first filter instance parameter associated with the first application, instantiate a first filter instance using the first filter instance parameter, and process the first request using the first filter instance, wherein the client resides on one of the plurality of nodes, wherein the first filter instance resides on one of the plurality of nodes, and wherein the agent resides on one of the plurality of nodes.

Other aspects of the invention will be apparent from the following description and the appended claims.

DETAILED DESCRIPTION

Figure 1:
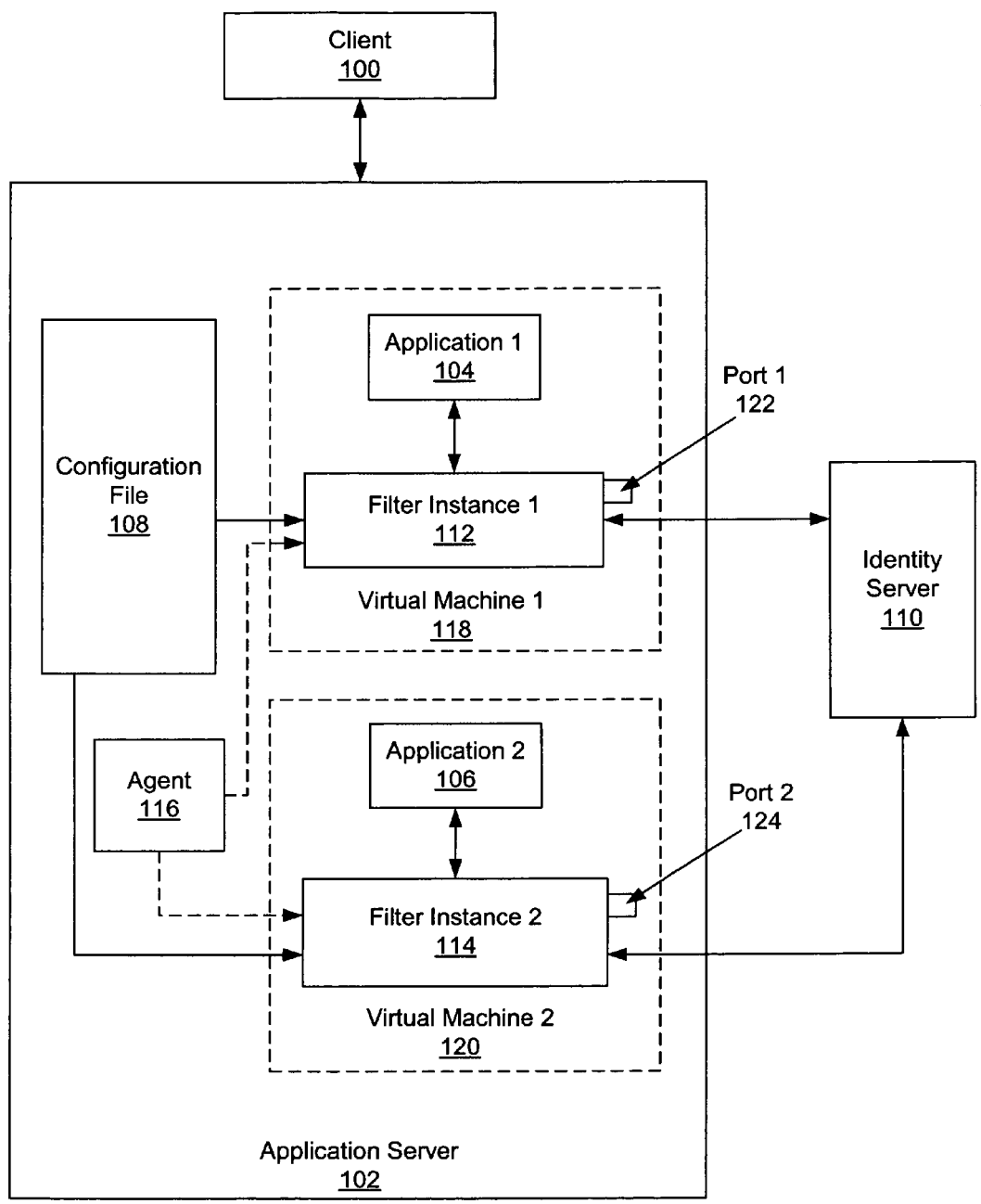
FIG. 1 shows a client/server system in accordance with an embodiment of the invention.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of embodiments of the invention, numerous specific details are set forth in order to provide a more thorough understanding of the invention. In other instances, well-known features have not been described in detail to avoid obscuring the invention.

In general, embodiments of the invention relate to a method and system to protect multiple applications on an application server. More specifically, embodiments of the invention relate to protecting multiple applications running on different virtual machines by instantiating one or more filter instances for each application. Further, embodiments of the invention relate to using one configuration file to instantiate several filter instances to facilitate the protection of multiple applications running on an application server.

FIG. 1 shows a client/server system in accordance with one embodiment of the invention. The client/server system includes a client (100), an application server (102) that includes functionality to host multiple applications (i.e., Application 1 (104), Application 2 (106)), a configuration file (108), an agent (116) and an identity server (110). Additionally, in one embodiment of the invention, the client/server system includes filter instances (i.e., Filter. Instance 1 (112), Filter Instance 2 (114)), where each filter instance (112, 144) is associated with an application (e.g., 104, 106). Further, the applications (104, 106) and respective filter instances (112, 114) are running on different virtual machines (i.e., Virtual Machine 1 (118), Virtual Machine 2 (120)) using different port numbers (i.e., Port 1 (122), Port 2 (124)).

In one embodiment of the invention, a client (100) initiates communication with the application server (102) by requesting access to one or more applications (104, 106). In one embodiment of the invention, the application server (102) may be any application server (102) capable of hosting applications (104, 106) (e.g., WebLogic, Oracle, Tomcat, etc.). More specifically, the client (100) may request access to specific resources available via the applications (104, 106). In one embodiment of the invention, the request sent by the client (100) is a HyperText Transfer Protocol (HTTP) request. Further, when the request is received by the application server (102), the request is intercepted by an agent (116). The agent (116) is a platform component (i.e., software) that is specific to the application server (102) and includes functionality to protect hosted applications (104, 106) that may require various security policies. The agent (116) includes functionality to provide several functions such as caching, event notification, etc.

More specifically, in one embodiment of the invention, the agent (116) includes an agent filter (not shown) that hooks into the applications (104, 106) to intercept the request from the client (100). Further, the agent filter (not shown) is used to initiate an authentication process to authenticate the client (100). In one embodiment of the invention, the agent filter (not shown) enforces the security policies that govern the access to a protected application's (e.g., 104, 106) resources. Specifically, the agent filter (not shown) includes functionality to communicate with the identity server (110) to authenticate the client (100). Further, in one embodiment of the invention, the agent (116) may replicate the agent filter (not shown) in the form of a filter instance (e.g., 112, 114) associated with each application (e.g., 104, 106) to perform the authentication for the request to access the particular application (e.g., 104, 106) (described below).

As noted above, the agent filter (not shown) (or filter instance (e.g., 112, 114)) communicates with the identity server (110) to authenticate the client (100). In one embodiment of the invention, the identity server (110) includes functionality to provide user management, service management, and security policy management. For example, the identity server (110) may send notifications to the individual port numbers (122, 124) of the filter instances (112, 114) regarding specific events. Specifically, the identity server (110) allows an application developer to define security policies to protect applications (104, 106) hosted by the application server (102). Further, in one embodiment of the invention, the identity server (110) contains security information for several 'roles' with which the client (100) may be associated with. In one embodiment of the invention, a role determines the level of authorized access provided to an authenticated client (100). For example, a particular client may be authenticated by the agent and mapped to the role of 'manager.' The 'manager' role may include authorized access to areas of protected applications that may be restricted to other roles (e.g., a role of 'employee'). Similarly, the 'manager' role may also exclude access to alternate areas of protected applications, which are only available to roles with higher authorized access. Those skilled in the art will appreciate that the role-to-principal mappings may be used to protect applications hosted by the application server, including Java 2 Platform, Enterprise Edition (J2EE) applications.

Continuing with FIG. 1, as mentioned above, the system shown includes a configuration file (108). In one embodiment of the invention, the configuration file (108) is responsible for storing the configuration details of the applications (104, 106) that are running on the application server (102). For example, when an application is deployed onto the application server, the agent queries the application to obtain the application's port number, filter mode, a protocol to install the application, a notification URL, cache timings, and various other parameters. This information is subsequently stored in the configuration file (108). Therefore, the configuration file (108) stores all the configuration information for each application running on the application server. Although FIG. 1 shows the configuration file and the agent individually, those skilled in the art will appreciate that the configuration file may be stored in multiple locations within the system, such as within the agent (116).

Further, in one embodiment of the invention, the configuration file (108) and the agent filter (not shown) are used to instantiate a filter instance corresponding to a particular application (i.e., Filter Instance 1 (112) corresponding to Application 1 (104), Filter Instance 2 (114) corresponding to Application 2 (106)) for which a request to access the application (e.g., 104, 106) has been made by the client (100). In one embodiment of the invention, the filter instance (e.g., 112, 114) is an in-memory copy of the agent filter (not shown) that is used to provide application-specific protection based on security policies associated with the application. In other words, the agent filter (not shown) portion of the agent (116) is replicated multiple times in memory to instantiate multiple filter instances (112, 114) that are specific to an application (e.g., 104, 106) on a particular virtual machine (e.g., 118, 120).

In one embodiment of the invention, each application (e.g., 104, 106) running within the application server (102) may require separate filter instances (112, 114) corresponding to the application's specific configuration parameters. Specifically, applications (104, 106) running within separate containers on individual virtual machines (118, 120) may require different filter modes, port numbers (122, 124), authentication mechanisms, etc. In this case, the agent (116) uses the configuration file (108) to determine the filter instance parameters required to instantiate a filter instance (e.g., 112, 114) for each application (e.g., 104, 106). In one embodiment of the invention, filter instance parameters are the parameters obtained from the configuration file (108) that are used to instantiate a filter instance (e.g., 112, 114) corresponding to a particular application (e.g., 104, 106). For example, Code Sample 1 below shows configuration parameters that may be included in a configuration file used to determine the port numbers and filter modes corresponding to filter instances instantiated for Application 1 (104) and Application 2 (106):

Code Sample 1
com.sun.am.policy.amFilter.notification.port[app1]=7001
com.sun.am.policy.amFilter.notification.port[app2]=9002
com.sun.am.policy.amFilter.mode.map[app1]=ALL
com.sun.am.policy.amFilter.mode.map[app2]
   =J2EE_POLICY The filter instance parameters shown in Code Sample 1 are used to indicate to the agent that Application 1 (104), running on Virtual Machine 1 (118), is expecting notifications at port number 7001. Similarly, Application 2 (106), running on Virtual Machine 2 (120), is expecting notifications at port number 9002. In one embodiment of the invention, several filter modes exist that correspond to different levels of security policy checking. For example, filter modes may include ALL, J2EE Policy mode, URL Policy mode, NONE, etc. In Code Sample 1, the filter instance corresponding to Application 1 (104) specifies ALL mode, and the filter instance corresponding to Appliation 2 (106) specifies J2EE Policy mode. Thus, using one configuration file, the agent (116) is capable of instantiating several filter instances (112, 114) that may be used to protect individual applications (104, 106) running on separate virtual machines (118, 120).

Those skilled in the art will appreciate that filter instances may also be instantiated for applications running on the same virtual machine using different ports. Further, the examples shown in Code Sample 1 use mapping as the method of corresponding filter instance parameters to specific applications (i.e., each configuration parameter is mapped to a corresponding value). Those skilled in the art will appreciate that several other methods of specifying filter instance parameters may exist, such as using a list construct to list the filter instance parameters for specific applications.

In one embodiment of the invention, instantiation of a filter instance (e.g., 112, 114) is implemented using a software bus architecture in which the agent (108) and all the functionalities that the agent (108) supports are on the bus such that any component of the application server (102) may listen for this information on the bus. Specifically, all the components, including the agent (108), register themselves with the software bus. In one embodiment of the invention, the software bus includes a common cache for storing all the components. Therefore, because the entire code-based of the agent sits on the software bus, a portion of the code-based (i.e., the filter) may be replicated for each application running on the application server. Components can communicate via the software bus and listen for notifications. In one embodiment of the invention, once the filter instance (e.g., 112, 114) is instantiated, the filter instance (e.g., 112, 114) is cached upon the software bus.

Figure 2:
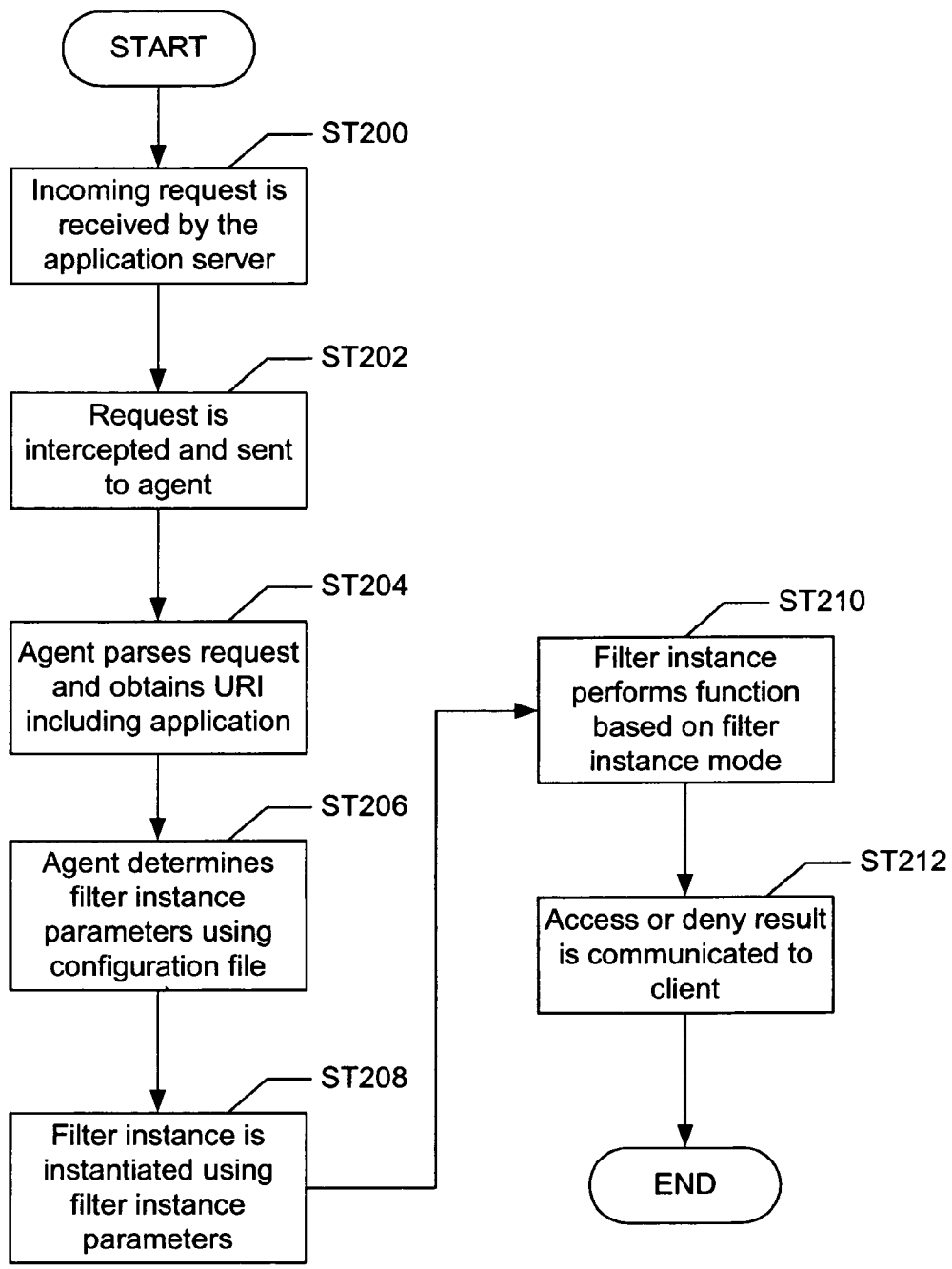
FIG. 2 shows a flow chart for instantiating a filter instance in accordance with an embodiment of the invention.

FIG. 2 shows a flow chart for instantiating a filter instance in accordance with one embodiment of the invention. Initially, a request is received by the application server from a client (Step 200). Subsequently, the request is intercepted by the agent (202). Specifically, the request is intercepted by the agent filter that is part of the agent. In one embodiment of the invention, the filter is hooked into the application via an extensible markup language (XML) file that is associated with the application. The agent then parses the request and obtains the universal resource identifier (URI) in the request (Step 204). The URI allows the agent to determine the particular application associated with the request. Once the agent has determined the application corresponding to the request, the agent uses the configuration file to obtain filter instance parameters (Step 206). In one embodiment of the invention, the filter instance parameters are used to instantiate a filter instance with the correct port number, filter mode, etc., for the corresponding application. Upon obtaining the appropriate filter instance parameters, the agent instantiates a filter instance with the filter instance parameters determined in Step 206 (Step 208).

At this point, the filter instance performs the functions (e.g., security policy checks, intercepting subsequent requests for the application, etc.) based on the mode of operation associated with the application (Step 210). Subsequently, based on the results of the policy checks with the identity server, the client is notified of a result (i.e., access granted/denied) corresponding to the client's request (Step 212). In one embodiment of the invention, the identity server returns the result of a client authentication in the form of a cookie that includes the client credentials established for the client session. Once the cookie is established, the identity server may then validate any security policies specified in the filter mode associated with the application that the client is attempting to access.

Additionally, in one embodiment of the invention, when one or more filter instance parameters (e.g., the filter mode) is changed for the particular application (i.e., the descriptor is changed to specify a different security policy), a new filter instance may be generated using the new filter instances parameters updated in the configuration file, and the previous filter instance is destroyed. Those skilled in the art will appreciate that there may be cases in which the filter instance corresponding to an application may stop working. For example, a filter instance may not work when the application server goes down, etc. In this case, the client may be denied access to the particular application or resources requested until filter instance is capable of processing the request or the agent is capable of instantiating a new filter instance for the application.

To illustrate a specific use of the method of FIG. 2, a scenario in which the application server is an Oracle application server running a particular J2EE application in a container is presented below. In the particular case of an Oracle application server, a console, through which a user may perform administrative functions, is initiated within a separate container on a different virtual machine. In this case, both the first container with the application and the second container including the console need to be protected using different security policies and different filter modes. Therefore, two filter instances would be instantiated by the agent that is installed on the Oracle application server, where each filter instance is running in a different filter mode corresponding to the level of security and policy validation required for each of the containers. Further, both filter instances are instantiated using the same agent code-base.

Figure 3:
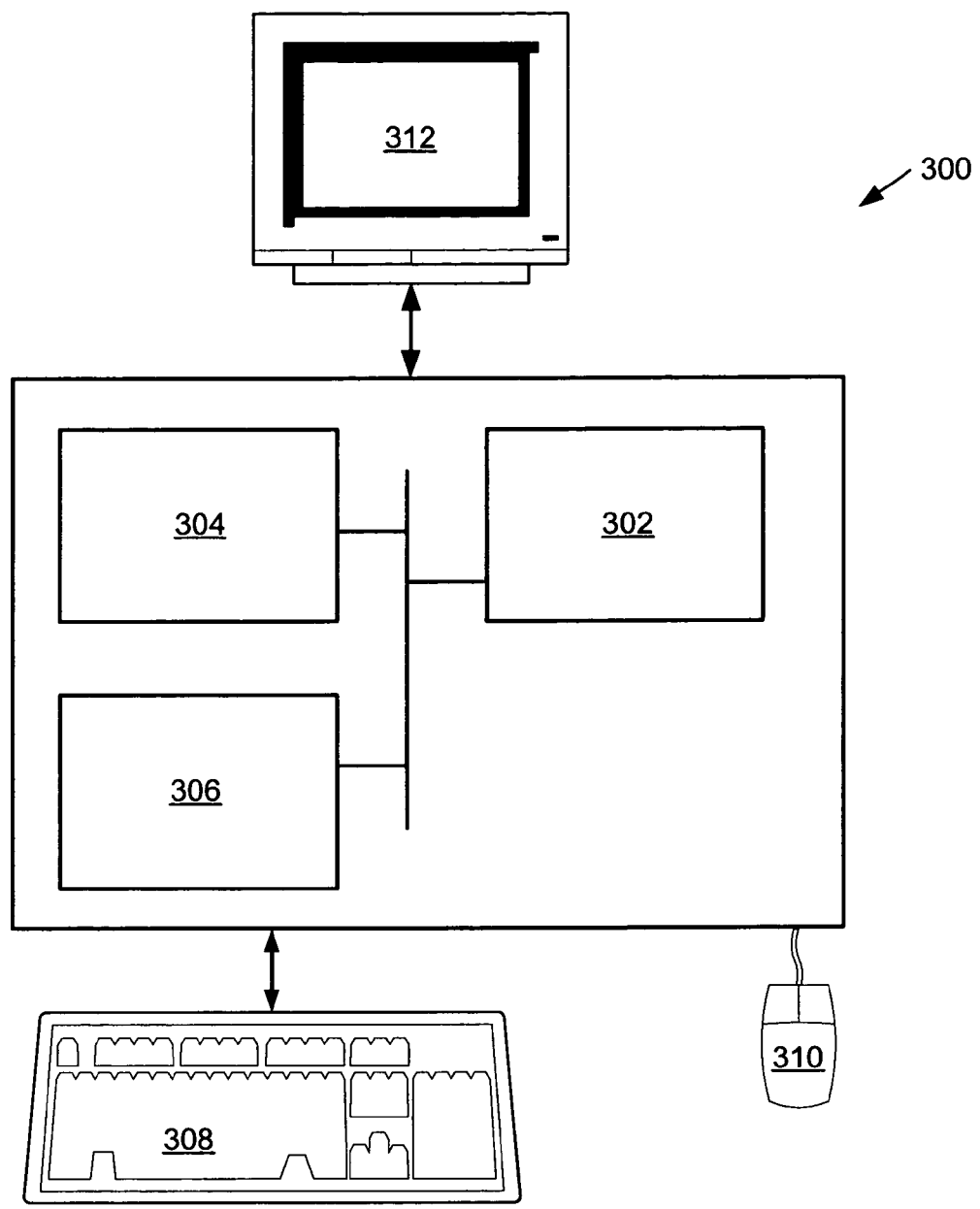
FIG. 3 shows a computer system in accordance with an embodiment of the invention.

One or more embodiments of the invention may be implemented on virtually any type of computer regardless of the platform being used. For example, as shown in FIG. 3, a networked computer system (300) includes a processor (302), associated memory (304), a storage device (306), and numerous other elements and functionalities typical of today's computers (not shown). The networked computer (300) may also include input means, such as a keyboard (308) and a mouse (310), and output means, such as a monitor (312). The networked computer system (300) is connected to a local area network (LAN) or a wide area network via a network interface connection (not shown). Those skilled in the art will appreciate that these input and output means may take other forms. Further, those skilled in the art will appreciate that one or more elements of the aforementioned computer (300) may be located at a remote location and connected to the other elements over a network.

Further, embodiments of the invention may be implemented on a distributed system having a plurality of nodes, where each portion of the invention (e.g., the agent, the filter instances, the virtual machines, the identity server, etc.) may be located on a different node within the distributed system. In one embodiment of the invention, the node corresponds to a computer system. Alternatively, the node may correspond to a processor with associated physical memory.

Embodiments of the invention allow the use of one configuration file and one agent to instantiate multiple filter instances corresponding to applications running on different virtual machines. Further, embodiments of the invention allow for a small portion of the agent to be copied in memory to instantiate one or more filter instances for different applications.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer usable storage medium having computer readable program code embodied therein, the computer readable program code adapted to, when executed by a processor, implement a method for processing a first request, the method comprising:
receiving, at an application server, the first request from a client;
intercepting the first request by an agent;
determining a first application associated with the first request, wherein the first application is one of a plurality of applications included in the application server;
determining a first filter instance parameter associated with the first application, wherein the first filter instance parameter comprises at least one selected from the group consisting of a port number, a filter mode, a cache timing, and a form log-in page authentication;
instantiating, by the agent, a first filter instance using the first filter instance parameter;
processing the first request using the first filter instance;
receiving a second request from the client;
intercepting the second request by the agent;
determining a second application associated with the second request, wherein the second application is one of the plurality of applications;
determining a second filter instance parameter associated with the second application;
instantiating, by the agent, a second filter instance using the second filter instance parameter; and
processing the second request using the second filter instance,
wherein the first filter instance and the first application are located on a first virtual machine,
wherein the first filter instance is configured to authenticate the client to access the first application,
wherein the second filter instance and the second application are located on a second virtual machine,
wherein the second filter instance is configured to authenticate the client to access the second application, and
wherein the first filter instance parameter and the second filter instance parameter reside in a configuration file.

2. The computer usable storage medium of claim 1, wherein instantiating the first filter instance comprises instantiating an in-memory copy of an agent filter.

3. The computer usable storage medium of claim 1, wherein determining the first application associated with the first request comprises:
parsing the first request to obtain a universal resource identifier (URI); and
determining the first application associated with the first request using the URI.

4. The computer usable storage medium of claim 1, wherein the filter mode comprises one selected from the group consisting of SSO only mode, URL policy mode, J2EE policy mode, ALL mode, and NONE mode.

5. The computer usable storage medium of claim 1, wherein processing the first request using the first filter instance comprises providing access to the first application if authentication of the client is successful.

6. A computer system for processing requests, comprising:
a processor;
a memory;
a storage device; and
software instructions stored in the memory for enabling the computer system under control of the processor, to:
receive a first request from a client;
intercept the first request by an agent;
determine a first application associated with the first request, wherein the first application is one of a plurality of applications;
determine a first filter instance parameter associated with the first application, wherein the first filter instance parameter comprises at least one selected from the group consisting of a port number, a filter mode, a cache timing, and a form log-in gage authentication;
instantiate, by the agent, a first filter instance using the first filter instance parameter; process the first request using the first filter instance;
receive a second request from the client;
intercept the second request by the agent;
determine a second application associated with the second request, wherein the second application is one of the plurality of applications;
determine a second filter instance parameter associated with the second application;
instantiate a second filter instance using the second filter instance parameter; and
process the second request using the second filter instance,
wherein the first filter instance and the first application are located on a first virtual machine,
wherein the first filter instance is configured to authenticate the client to access the first application,
wherein the second filter instance and the second application are located on a second virtual machine,
wherein the second filter instance is configured to authenticate the client to access the second application, and
wherein the first filter instance parameter and the second filter instance parameter reside in a configuration file.

7. A plurality of nodes, comprising:
a computer processor;
a client configured to send a first request and a second request; and
an agent, executing on the computer processor and configured to:
intercept the first request;
determine a first application associated with the first request, wherein the first application is one of a plurality of applications;
determine a first filter instance parameter associated with the first application, wherein the first filter instance parameter comprises at least one selected from the group consisting of a first port number, a first filter mode, a first cache timing, and a first form loci-in page authentication;
instantiate a first filter instance using the first filter instance parameter;
process the first request using the first filter instance;
intercept the second request;
determine a second application associated with the second request, wherein the second application is one of the plurality of applications;
determine a second filter instance parameter associated with the second application;
instantiate a second filter instance using the second filter instance parameter; and
process the second request using the second filter instance, wherein the first filter instance and the first application are located on a first virtual machine, wherein the first filter instance is configured to authenticate the client to access the first application, wherein the second filter instance and the second application are located on a second virtual machine, wherein the second filter instance is configured to authenticate the client to access the second application, wherein the first filter instance parameter and the second filter instance parameter reside in a configuration file, wherein the first virtual machine resides on one of the plurality of nodes, wherein the second virtual machine resides on one of the plurality of nodes, wherein each of the plurality of nodes comprises a processor, wherein the client resides on one of the plurality of nodes, wherein the first filter instance resides on one of the plurality of nodes, wherein the second filter instance resides on one of the plurality of nodes, and wherein the agent resides on one of the plurality of nodes.

8. The plurality of nodes of claim 7, further comprising:
a configuration file configured to store the first filter instance parameters and the second filter instance parameter.

9. The plurality of nodes of claim 7, further comprising:
an identity server configured to communicate with the first filter instance to authenticate the client.

10. The plurality of nodes claim 9, wherein the first filter instance is configured to communicate with the identity server to process the first request.

11. The plurality of nodes of claim 7, wherein processing the first request comprises providing access to the first application if authentication of the client is successful.

12. The plurality of nodes of claim 7, wherein the agent comprises an agent filter.

13. The plurality of nodes of claim 12, wherein instantiating the first filter instance comprises instantiating an in-memory copy of the agent filter.

14. The plurality of nodes of claim 7, wherein the filter mode comprises one selected from a group consisting of a SSO only mode, a URL policy mode, a J2EE policy mode, an ALL mode, and a NONE mode.

15. The plurality of nodes of claim 7, wherein the second filter instance parameter comprises at least one selected from a group consisting of a second port number, a second filter mode, a second cache timing, and a second form login page authentication.

\* \* \* \* \*